US006240719B1

(12) United States Patent
Vondrell et al.

(10) Patent No.: US 6,240,719 B1
(45) Date of Patent: Jun. 5, 2001

(54) FAN DECOUPLER SYSTEM FOR A GAS TURBINE ENGINE

(75) Inventors: Randy M. Vondrell, Sharonville; Wu-Yang Tseng, West Chester; Christopher C. Glynn, Hamilton, all of OH (US)

(73) Assignee: General Electric Company, Cincinnati, OH (US)

(*) Notice: Subject to any disclaimer, the term of this patent is extended or adjusted under 35 U.S.C. 154(b) by 0 days.

(21) Appl. No.: 09/207,818

(22) Filed: Dec. 9, 1998

(51) Int. Cl.[7] ................................ F02K 3/04; F02K 3/06

(52) U.S. Cl. ......................... 60/223; 60/39.091; 60/39.31

(58) Field of Search .................................... 60/226.1, 223, 60/39.091, 39.31

(56) References Cited

U.S. PATENT DOCUMENTS 4,313,712 * 2/1982 Briggs ...................................... 416/2
4,375,906 3/1983 Roberts et al. ...................... 308/178
4,827,712 * 5/1989 Coplin ................................ 60/226.1
5,433,584 * 7/1995 Amin et al. .......................... 415/229
5,974,782 * 11/1999 Gerez ..................................... 60/223
6,073,439 * 6/2000 Beaven et al. .......................... 60/223
6,098,399 * 8/2000 Richards et al. ....................... 60/223
6,109,022 * 8/2000 Allen et al. ............................ 60/223

FOREIGN PATENT DOCUMENTS

2192233 * 4/1988 (GB) .

* cited by examiner

*Primary Examiner*—Ted Kim
(74) *Attorney, Agent, or Firm*—Andrew C. Hess; Nathan D. Herkamp

(57) ABSTRACT

A support structure for a gas turbine engine includes a support arm (214, 216) extending between a low pressure shaft (202) and a rotor. The support arm includes a fuse (220) having a low failure point. A high pressure stub shaft (270) axially and radially supports the low pressure shaft (202) after fuse failure. An axial gap (A) between a portion of the low pressure shaft and the stub shaft permits movement of the low pressure shaft after fuse failure. A radial gap (B) between the stub shaft (270) and the low pressure shaft (202) allows radial deflection of the low pressure rotor system after fuse failure.

20 Claims, 4 Drawing Sheets

FAN DECOUPLER SYSTEM FOR A GAS TURBINE ENGINE

BACKGROUND OF THE INVENTION

This invention relates generally to fan support systems and, more particularly, to a fan decoupler system for fan imbalances on a gas turbine engine.

Gas turbine engines include a fan section, a compressor section, a combustor section, and a turbine section. A shaft extends axially through the turbine section and rotates a rotor. The rotor includes multiple stages of disks. Each disk carries circumferentially spaced apart blades that extend radially across a gas flow path. Rotor support structure typically includes a support cone extending from a bearing often referred to as the number one bearing.

During a large birdstrike, fan bladeout, or other large fan imbalance event, structural loads carried throughout the engine carcass, flanges, engine frame, and mounts, can be quite large. Typically, these loads are compensated for by stiffening the system and providing a fan critical speed significantly above the operating speeds of the engine. As a result, the structural loads are reduced, and the entire structure is fabricated to account for the reduced loads. Such compensation for a potential fan imbalance event, however, results in a structure which may be heavier than desired.

Accordingly, it would be desirable to provide a support structure system that adequately handles a large fan imbalance event, without adding significant weight to the gas turbine engine. Additionally, it would be desirable for the support structure system to be cost effective.

SUMMARY OF THE INVENTION

These and other objects may be attained by a support structure for a gas turbine engine that includes a member having a reduced failure point. In accordance with one embodiment, the turbine engine includes a support cone having a support arm. The support arm extends between the low pressure shaft and the rotor, and includes a fuse having a failure point below the failure point of the remaining portion of the support cone. The fuse includes a bolt that connects two portions of the support arm. The bolt extends through a segmented spacer positioned between the two sections. The bolt has a failure point selected to coincide with a predetermined imbalance load.

The high pressure shaft includes a stub shaft that axially and radially supports the low pressure shaft after failure of the bolt. An axial opening extends between a portion of the low pressure shaft and the stub shaft. The opening permits movement of the low pressure shaft toward the stub shaft after the bolt has failed. Movement of the low pressure shaft towards the stub shaft positions the two shafts in contact with each other and causes both shafts to decelerate to a common speed. The low pressure shaft and the stub shaft continue to rotate at the same speed due, at least in part, to the friction between the two shafts.

A radial opening exists between the stub shaft and the low pressure shaft prior to bolt failure. The radial opening allows free radial deflection of the low pressure rotor system after fuse failure. A radial opening between a high pressure rotor disk and the low pressure shaft permits the bore at the tip of the rotor disk to contact the low pressure shaft after bolt failure. The rotation of the high pressure rotor is slowed due to contact of the low pressure shaft with the stub shaft.

The support cone including the fuse provides a failure point in the structural load path which "softens" the structural system during a large imbalance event to allow the low pressure shaft to move axially and radially with respect to the high pressure shaft. This failure point reduces the overall peak loads carried by the structural system. The structural system can thus be lighter and less costly than previous structural systems that were stiffened to handle large imbalance loads.

DETAILED DESCRIPTION

Figure 1:
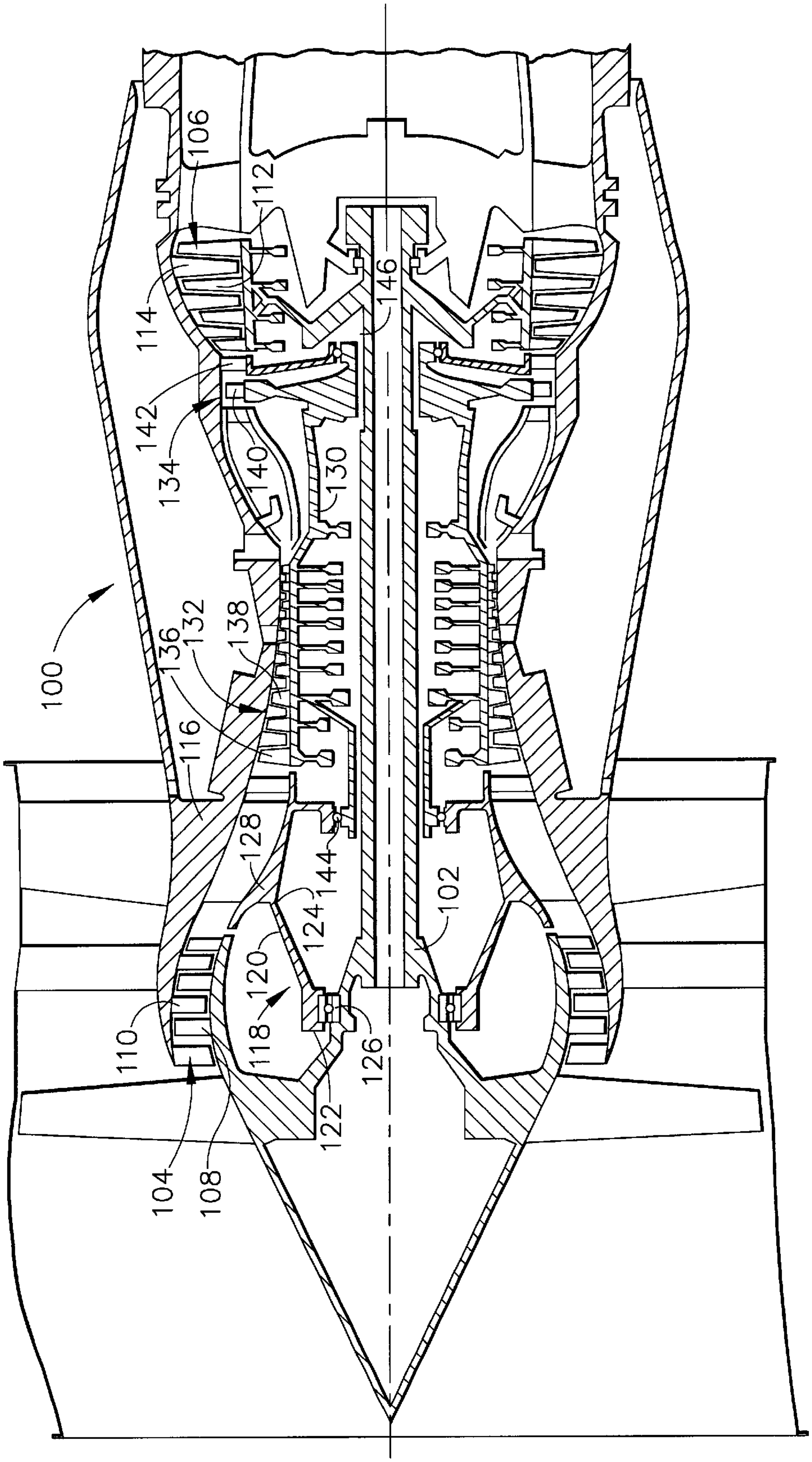
FIG. 1 (PRIOR ART)
FIG. 1 is a schematic view of a gas turbine engine well known in the art.

FIG. 1 is a schematic view of a well known gas turbine engine 100 including a low pressure shaft 102 attached to a low pressure compressor 104 and a low pressure turbine 106. Low pressure compressor 104 includes a plurality of rotors 108 and a plurality of stators 110. Low pressure turbine 106 also includes a plurality of rotors 112 and a plurality of stators 114. Stators 110, 114 are connected to a frame 116 of motor 100. Rotors 108, 112 are connected to low pressure shaft 102 so that when low pressure turbine rotors 112 rotate, low pressure compressor rotors 108 also rotate.

A number one bearing support cone 118 supports rotors 108 and low pressure shaft 102. Bearing support cone 118 includes a number one bearing support arm 120 with a first end 122 and a second end 124. First end 122 is connected to a number one ball bearing 126 that contacts low pressure shaft 102. Second end 124 is connected to a fan frame hub 128. Bearing support arm 120 supports low pressure shaft 102 both axially and radially.

Engine 100 also includes a high pressure shaft 130 attached to a high pressure compressor 132 and a high pressure turbine 134. High pressure compressor 132 includes at least one rotor 136 and a plurality of stators 138. High pressure turbine 134 also includes at least one rotor 140 and a plurality of stators 142. Stators 138, 142 are connected to frame 116 of motor 100. Rotors 136, 140 are connected to high pressure shaft 130 so that when high pressure turbine rotor 140 rotates, high pressure compressor rotor 136 also rotates.

High pressure shaft 130 and low pressure shaft 102 are substantially concentric with high pressure shaft 130 located on an exterior side of low pressure shaft 102. High pressure shaft 130 includes bearings 144, 146 that contact frame 116 of engine 100. High pressure shaft 130 is allowed to rotate freely with respect to low pressure shaft 102, with no contact during normal operation.

Figure 2:
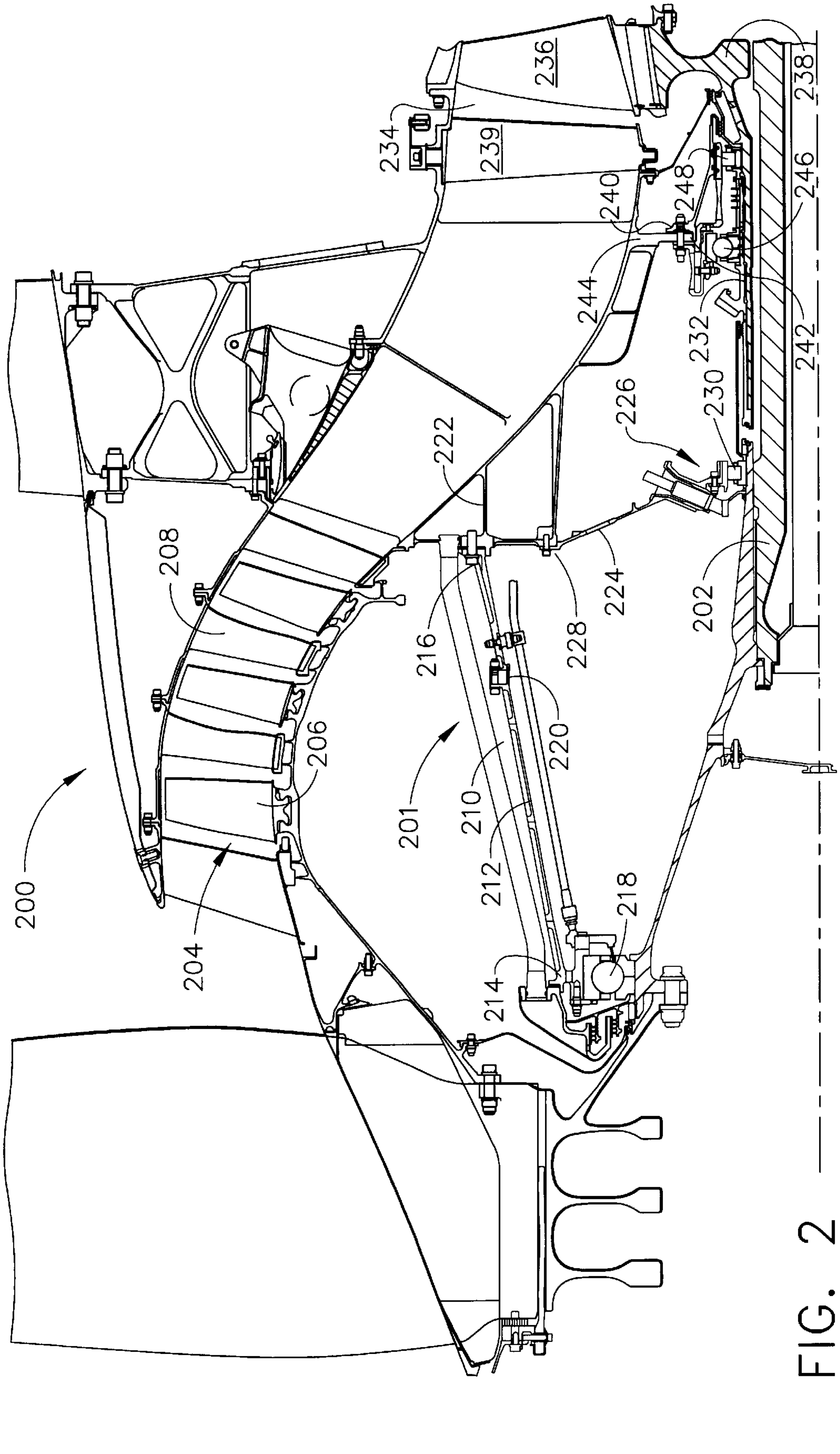
FIG. 2 is a partial schematic view of a gas turbine engine according to one embodiment of the present invention.

FIG. 2 is a schematic view of a portion of a gas turbine engine 200 including a fan decoupler system 201 according to one embodiment of the present invention. Engine 200 includes a low pressure shaft 202 attached to a low pressure compressor 204 and a low pressure turbine (not shown). Low pressure compressor 204 includes a plurality of rotors 206 and a plurality of stators 208. The low pressure turbine also includes a plurality of rotors (not shown) and a plurality of stators (not shown). Compressor rotors 206 and the turbine rotors are connected to low pressure shaft 202 so that when the low pressure turbine rotors rotate, low pressure compressor rotors 206 also rotate.

A number one bearing support cone 210 provides support for rotors 206 and low pressure shaft 202. Bearing support cone 210 includes a number one bearing support arm 212 with a first portion 214 and a second portion 216. First portion 214 is connected to a number one bearing 218 that contacts low pressure shaft 202. First portion 214 extends between number one bearing 218 and a fuse 220. In one embodiment, bearing 218 is a ball bearing. Second portion 216 is connected to a fan frame hub 222 and extends between fan frame hub 222 and fuse 220. Bearing support arm 212 supports low pressure shaft 202 both axially and radially. Fuse 220 has a failure point below the failure point of the remaining support cone. The reduced failure point allows fuse 220 to fail during a large imbalance event prior to the failure of the remaining support cone. Failure of fuse 220 reduces the structural load on the remaining support cone. Fuse 220 is discussed below in greater detail.

A number two bearing support arm 224 has a first end 226 and a second end 228. First end 226 is connected to a number two bearing 230 that contacts low pressure shaft 202. In one embodiment, number two bearing 230 is a roller bearing. Second end 228 of support arm 224 attaches to fan frame hub 222 to provide additional stability to low pressure shaft 202.

Engine 200 also includes a high pressure shaft 232 attached to a high pressure compressor 234 and a high pressure turbine (not shown). High pressure compressor 234 includes at least one rotor 236 including a disk 238 and a plurality of stators (not shown). High pressure turbine (not shown) also includes at least one rotor (not shown) and a plurality of stators (not shown). Rotor 236 is connected to high pressure shaft 232 so that when the high pressure turbine rotor rotates, high pressure compressor rotor 236 also rotates. High pressure shaft 232 and low pressure shaft 202 are substantially concentric, and high pressure shaft 232 is positioned on an exterior side of low pressure shaft 202.

A number three bearing support 240 has a first end 242 and a second end 244. First end 242 is connected to a first number three bearing 246 that contacts high pressure shaft 232 and to a second number three bearing 248 that contacts high pressure shaft 232. In one embodiment, first number three bearing 246 is a ball bearing and second number three bearing 248 is a roller bearing. Second end 244 is connected to fan frame hub 222. Support 240 provides support for high pressure shaft 232.

Figure 3:
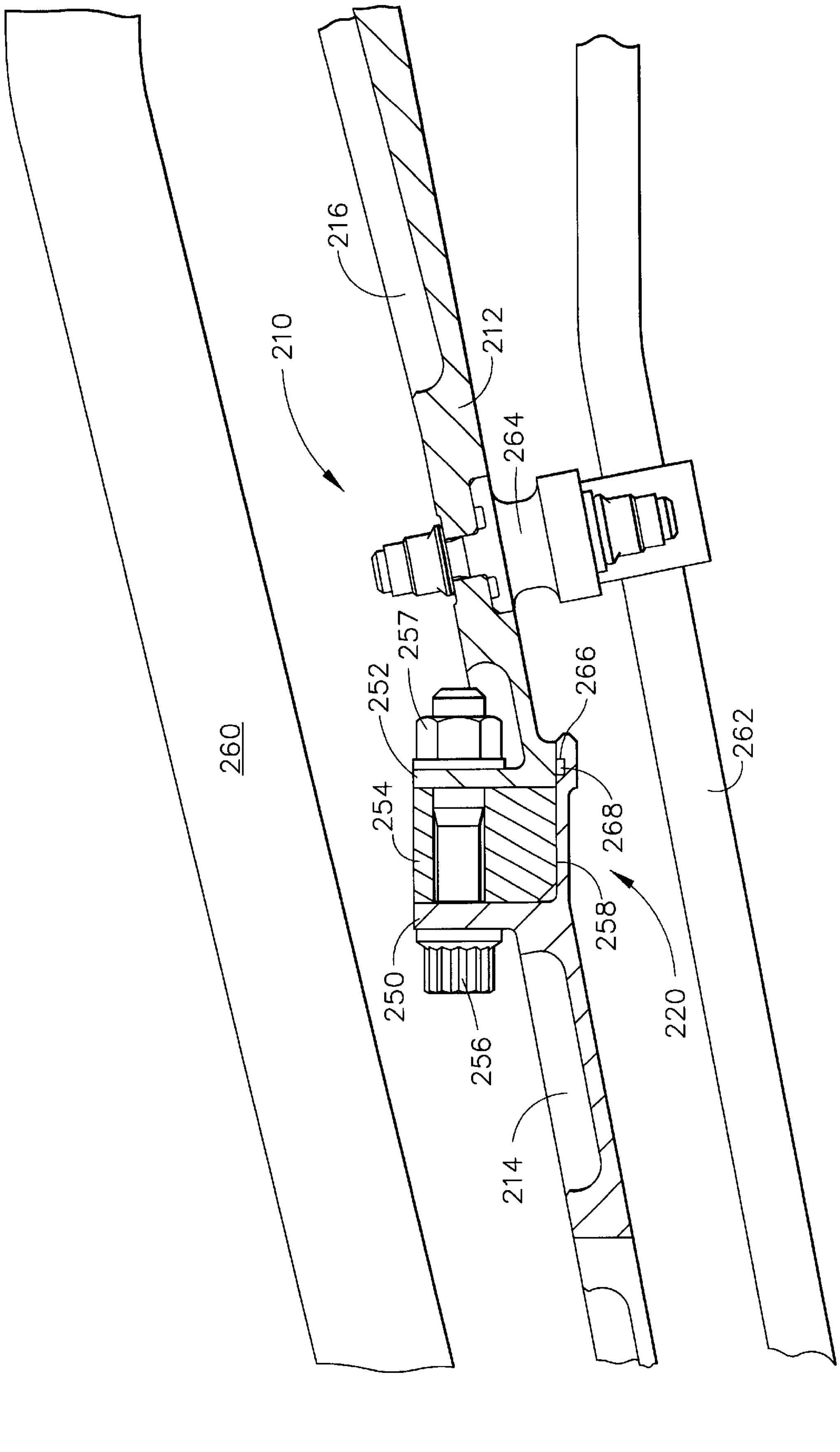
FIG. 3 is a schematic view of a fuse in the support structure of the gas turbine engine shown in FIG. 2.

FIG. 3 is a partial schematic view of number one bearing support cone 210 illustrating fuse 220. Support arm first portion 214 includes a first flange 250 including a first opening (not shown). The opening extends through flange 250. Support arm second portion 216 includes a second opening (not shown). The second opening extends through second portion 216. A spacer 254 is positioned between, and is adjacent to, first flange 250 and second flange 252. In one embodiment, spacer 254 is a segmented spacer that provides for easy removal of spacer 254 from fuse 220 when fuse 220 fails. After spacer 254 is removed from fuse 220, there is free motion between first portion 214 and second portion 216. A third opening (not shown) extends through spacer 254. The spacer opening is aligned with the first portion opening and the second portion opening. A bolt 256 extends through the openings of first flange 250, spacer 254, and second flange 252. Bolt 256 has a failure point set at a preselected force. The preselected force coincides with a predetermined imbalance load. In operation, if a large fan imbalance occurs in engine 200 and the load is above the predetermined imbalance load, bolt 256 will fail and allow first flange 250 to move relative to second flange 252. A nut 257 cooperates with bolt 256 to maintain bolt 256 in contact with first flange 250, spacer 254, and second flange 252. In one embodiment, a seal arm 258 extends from first portion 214 at first flange 250 and contacts second portion 216 adjacent flange 252.

An air tube 260 extends between first bearing 218 and fan frame hub 222. An oil supply tube 262 extends from number one bearing 218 along support arm 212. Oil supply tube 262 is connected to support arm 212 by a bolt 264 located downstream of fuse 220. Seal arm 258 includes a groove 266 with an o-ring 268 positioned within groove 266. Groove 266 and o-ring 268 cooperate with second portion 216 of support arm 212 to provide a seal on support arm 212. The seal prevents the oil within oil supply tube 262 from contacting fuse 220.

Figure 4:
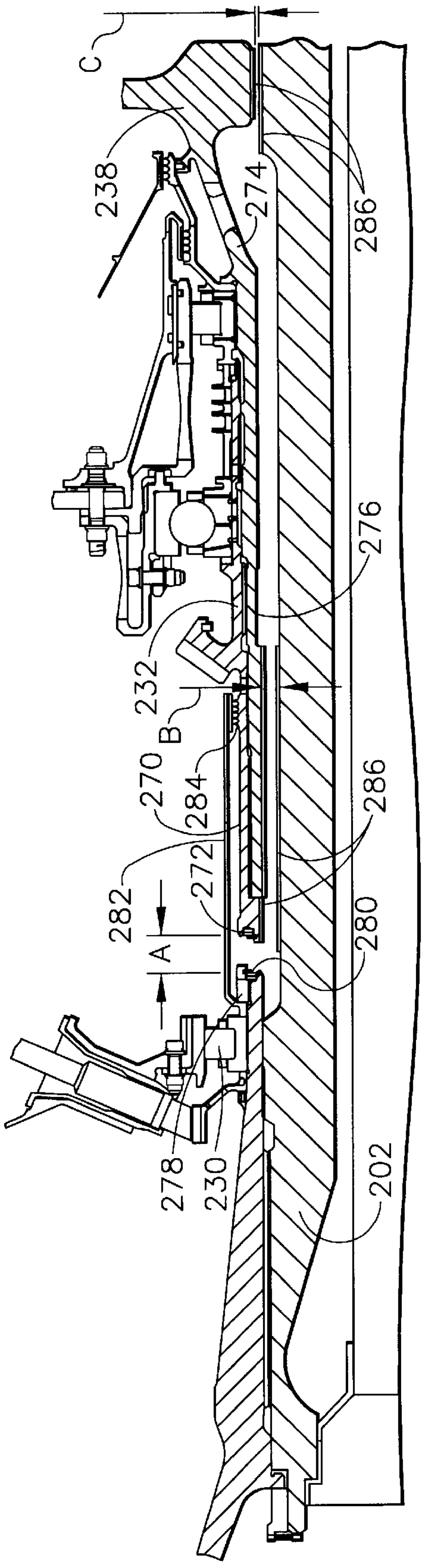
FIG. 4 is a partial schematic view of the high pressure and low pressure shafts in the gas turbine engine shown in FIG. 2.

FIG. 4 is a partial schematic view of high pressure shaft 232 and low pressure shaft 202 in engine 200. Low pressure shaft 202 extends between the low pressure compressor (not shown) and the low pressure turbine (not shown). High pressure shaft 232 includes a stub shaft 270 having an upstream end 272, a downstream end 274, and an internal side 276. Low pressure shaft 202 includes a lip 278 that extends downstream from bearing 230 and terminates at a downstream end 280 prior to stub shaft 270. Downstream end 280 is displaced a preselected axial distance from stub shaft 270 so that an axial gap A extends between upstream end 272 of stub shaft 270 and down stream end 280 of lip 278. Axial gap A is sized to permit low pressure shaft 202 at downstream end 280 to move aft and contact upstream end 272 of stub shaft 270. Stub shaft 270 supports low pressure shaft 202 during the expected inlet ram loads on low pressure shaft 202 that occur after a large fan imbalance event. In one embodiment, downstream end 280 of lip 278 and upstream end 272 of stub shaft 270 include mating surfaces that provide a better engagement between low pressure shaft 202 and high pressure shaft 232. A seal arm 282 extends from lip 278, across axial gap A, to stub shaft 220 downstream of upstream end 272. A plurality of sealed teeth 284 extend from seal arm 282 and contact stub shaft 272 to provide an air seal between seal arm 282 and an external side of stub shaft 270. The air seal prevents oil and sump air from flowing through axial gap A during normal operation.

Internal side 276 of stub shaft 270 is displaced a preselected distance from low pressure shaft 202 so that a radial gap B extends between internal side 276 and low pressure shaft 202. Radial gap B allows free radial deflection of low pressure shaft 202 after fuse 220 has failed. The free radial deflection minimizes windmill imbalance loads while maximizing peak load reductions. Stub shaft 270 supports low pressure shaft 202 after failure of fuse 220 at a location that is downstream of upstream end 272. Due to the support of low pressure shaft 202 by stub shaft 270, the critical speed of low pressure shaft 202 is sufficiently above expected windmill speeds to minimize windmill imbalance loads while maximizing peak load reductions.

Downstream end 274 of stub shaft 270 is connected to rotor disk 238. Rotor disk 238 is displaced a preselected distance from low pressure shaft 202 so that a radial gap 278 extends between rotor disk 238 and low pressure shaft 202. Radial gap 278 permits rotor disk 238 to contact low pressure shaft 202 after fuse 220 fails. The contact of disk 238 on low pressure shaft 202 slows the rotation of disk 238.

A friction coating 286 is applied to portions of stub shaft 270, compressor rotor disk 238, and low pressure shaft 202. Friction coating 286 reduces heat generation in low pressure shaft 202, stub shaft 270, and disk 238 during the short period before stub shaft 270 and low pressure shaft 202 begin to spin at equivalent speeds. In one embodiment, friction coating 286 is applied to internal side 276 of upstream end 272 and to a corresponding portion of low pressure shaft 202. Also, friction coating 286 is applied to rotor disk 238 and to a corresponding portion of low pressure shaft 202. Additionally, friction coating 286 can be applied to portions of internal side 276 and low pressure shaft 202 that correspond to anticipated contact points between shaft 270 and shaft 202 after an imbalance event. In one embodiment, friction coating 286 is an aluminum-bronze thermal spray coating.

Support cone 210 including fused support arm 212 permits free motion of first flange 250 and second flange 252 with respect to each other during a large imbalance deflection of low pressure rotor 206. In addition, stub shaft 270 provides both radial and axial support to low pressure shaft 202 after the decoupling event. Further, the critical speed of low pressure shaft 202 is significantly above expected windmill speeds due to the location of the contact points on high pressure shaft 232 and low pressure shaft 202, the size of the radial gap between high pressure shaft 232 and low pressure shaft 202, and the stiffness of both shafts. Also, friction coatings 286 on high pressure shaft 232 and low pressure shaft 202 reduce heat generation in shafts 232, 202 during the short period before shafts 232, 202 rotate at equivalent speeds.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A fan decoupler system for a gas turbine engine, said fan decoupler system comprising:

a low pressure shaft comprising a lip;

a high pressure shaft including an upstream end, a stub shaft, and a rotor disk, said high pressure shaft concentric with said low pressure shaft, said stub shaft located at said high pressure shaft upstream end, said low pressure shaft lip configured to engage said stub shaft;

a rotor connected to said low pressure shaft; and a support cone connected to said low pressure shaft, wherein said support cone is for supporting said rotor, said support cone including a fuse having a failure point below the failure point of the remaining support cone.

2. A fan decoupler system in accordance with claim 1 wherein said fuse comprises:

a first flange including a first opening therethrough;

a spacer adjacent said first flange and including a second opening therethrough;

a second flange including a third opening therethrough, said second flange located adjacent said spacer; and a bolt extending through said first flange, said spacer, and said second flange.

3. A fan decoupler system in accordance with claim 2 wherein said bolt has a failure point set at a predetermined imbalance load.

4. A fan decoupler system in accordance with claim 2 wherein said spacer is a segmented spacer.

5. A fan decoupler system in accordance with claim 1 wherein said high pressure shaft is configured to support said low pressure shaft after said fuse has failed.

6. A fan decoupler system in accordance with claim 5 wherein said low pressure shaft includes a lip displaced a preselected axial distance from said high pressure shaft, said preselected distance chosen to permit said low pressure shaft to move aft and contact said high pressure shaft.

7. A fan decoupler system in accordance with claim 6 wherein said low pressure shaft lip comprises a seal arm that extends across said preselected distance, said seal arm including a plurality of seal teeth that contact said stub shaft and provide an air seal.

8. A fan decoupler system in accordance with claim 5 wherein said high pressure shaft is displaced a preselected distance from said low pressure shaft, said preselected distance chosen to permit free radial deflection of said low pressure shaft member after said fuse fails.

9. A fan decoupler system in accordance with claim 8 wherein said low pressure shaft comprises a friction coating on at least a portion thereof and said rotor disk comprises a friction coating on at least a portion thereof, said low pressure shaft friction coating positioned to contact said rotor disk friction coating when said low pressure shaft deflects.

10. A fan decoupler system in accordance with claim 8 wherein said preselected distance from said rotor disk to said low pressure shaft is chosen to permit said low pressure shaft to contact said rotor disk after said fuse fails.

11. A fan decoupler system in accordance with claim 5 wherein said high pressure shaft is radially and axially positioned to configure said high pressure shaft to maintain a natural frequency for said low pressure shaft sufficiently above a windmill operating range to minimize loads on said low pressure shaft and said high pressure shaft.

12. A fan decoupler system in accordance with claim 1 wherein said support cone comprises a seal that protects said fuse.

13. A support structure for a gas turbine engine, said support structure comprising:

a high pressure shaft including a stub shaft located at an upstream end of said high pressure shaft, and a rotor disk located downstream of said stub shaft;

a low pressure shaft concentric with said high pressure shaft, said low pressure shaft comprising a lip configured to engage said stub shaft;

a fan frame hub; and a support arm extending between said low pressure shaft and said fan frame hub, said support arm comprising a fuse and a remaining portion, said fuse having a failure point below the failure point of said remaining portion of said support arm.

14. A support structure in accordance with claim 13 wherein said support arm further comprises:

a first portion including a first end connected to a bearing, and a second end having a first flange with a first opening therethrough;

a second portion including a first end connected to said fan frame hub, and a second end having a second flange with a second opening therethrough; and a spacer positioned between, and in contact with, said first flange and said second flange, said spacer having a third opening therethrough.

15. A support structure in accordance with claim 14 wherein said spacer is a segmented spacer configured to provide clearance to said support arm for motion after failure of said fuse.

16. A support structure in accordance with claim 14 wherein said fuse comprises a bolt extending through said first flange opening, said second flange opening, and said spacer opening, said bolt having a failure point set at a predetermined imbalanced load.

17. A support structure in accordance with claim 13 wherein said high pressure shaft is configured to axially and radially support said low pressure shaft after said fuse has failed.

18. A support structure in accordance with claim 13 wherein said low pressure shaft includes a portion displaced a preselected distance from said high pressure shaft, said distance sufficient to permit movement of said low pressure shaft toward said high pressure shaft after said fuse fails and to allow said portion of said low pressure shaft to contact said high pressure shaft.

19. A support structure in accordance with claim 13 wherein said stub shaft is displaced a preselected distance from said low pressure shaft, said distance sufficient to permit free radial deflection of said low pressure shaft after said fuse fails.

20. A support structure in accordance with claim 13 wherein said rotor disk is displaced a preselected distance from said low pressure shaft, said distance sufficient to permit said low pressure shaft to contact said rotor disk after said low pressure shaft deflects due to a large imbalance event; said rotor disk, at least a portion of said stub shaft and said low pressure shaft comprise a friction coating; said support arm comprises a seal arm extending across at least a portion of said fuse, said seal arm comprising a groove and an o-ring within said groove, said o-ring and said groove cooperating with said support arm to seal said fuse; and said low pressure shaft comprises a seal arm extending across said preselected distance, said seal arm including a plurality of seal teeth contacting said stub shaft and providing an air seal.

* * * * *